June 2, 1970  E. J. SIEMS  3,515,313
MOTORIZED SPREADER APPARATUS
Filed June 22, 1967  5 Sheets-Sheet 1
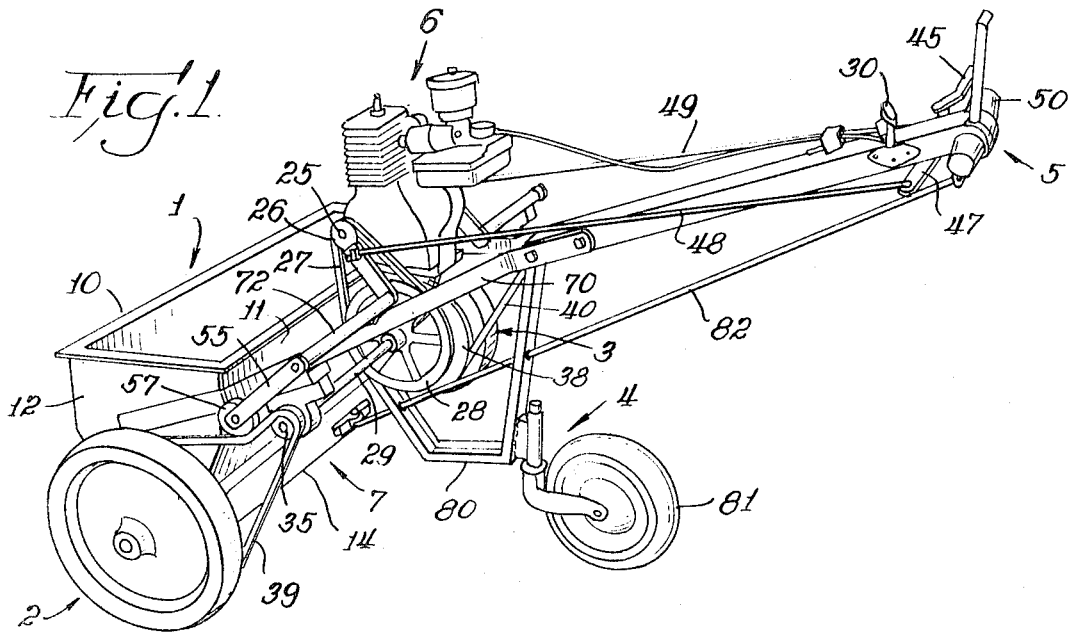
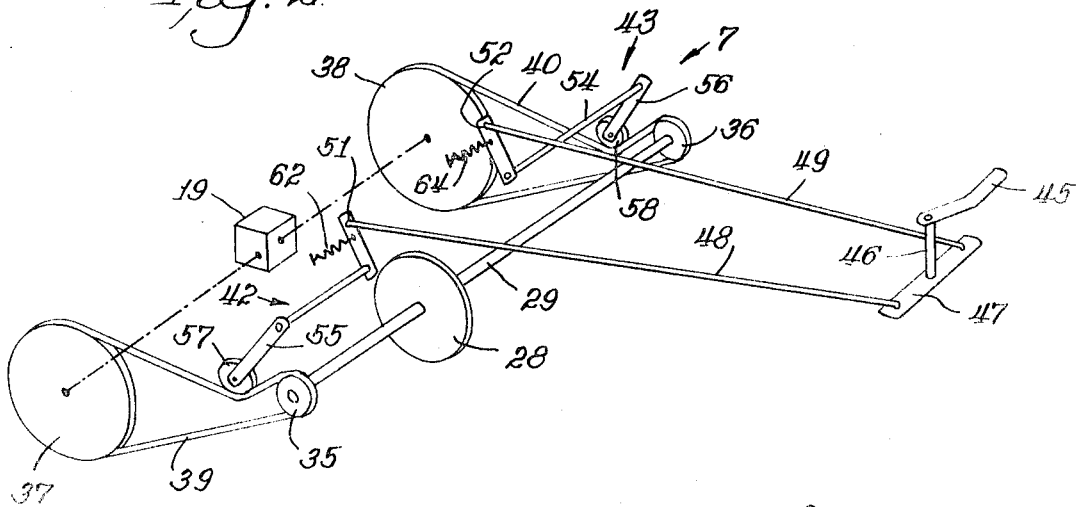
Inventor
Edward J. Siems
By Petherbridge, O'Neill & Aubel
Attys.

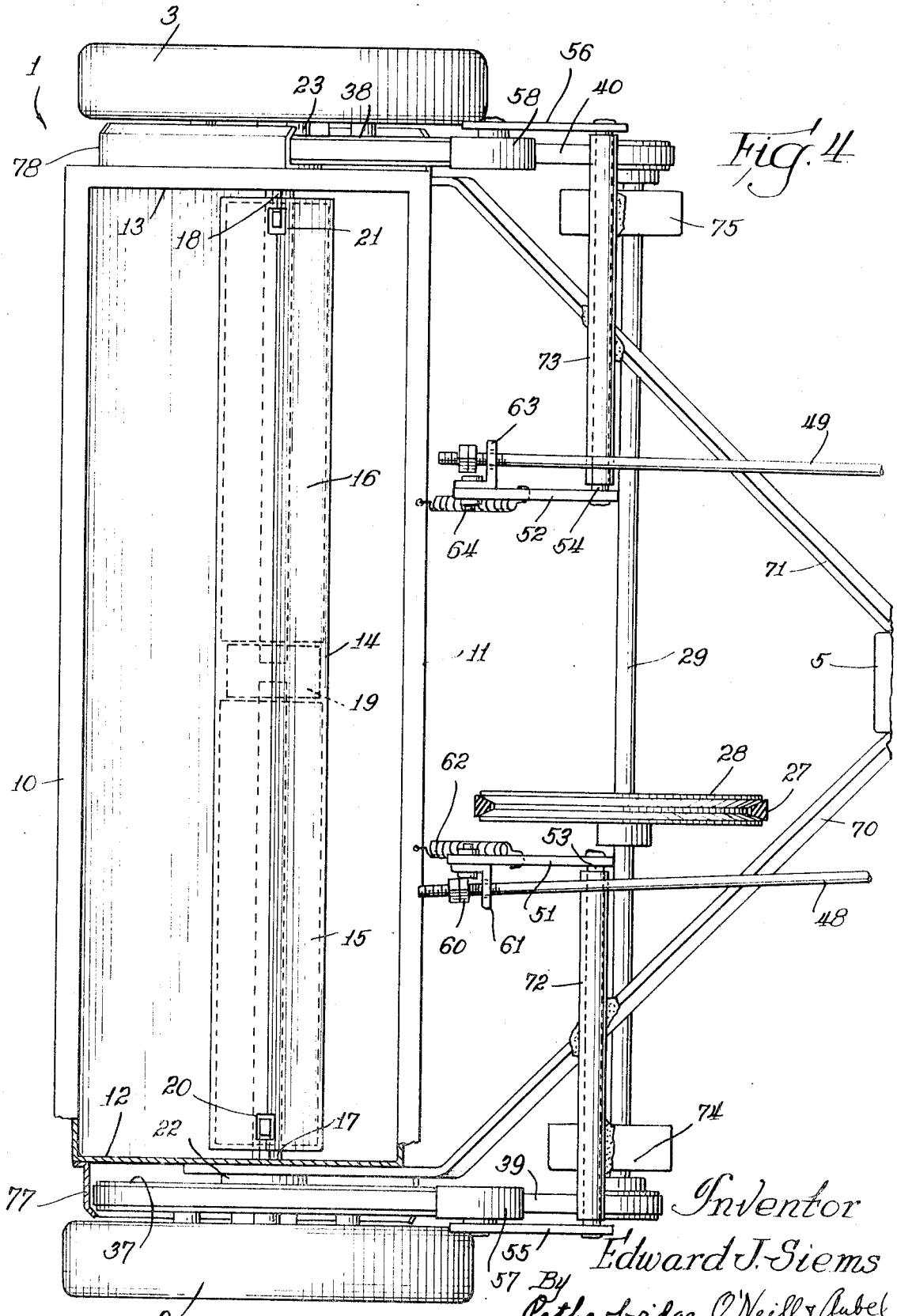

June 2, 1970   E. J. SIEMS   3,515,313
MOTORIZED SPREADER APPARATUS
Filed June 22, 1967   5 Sheets-Sheet 3
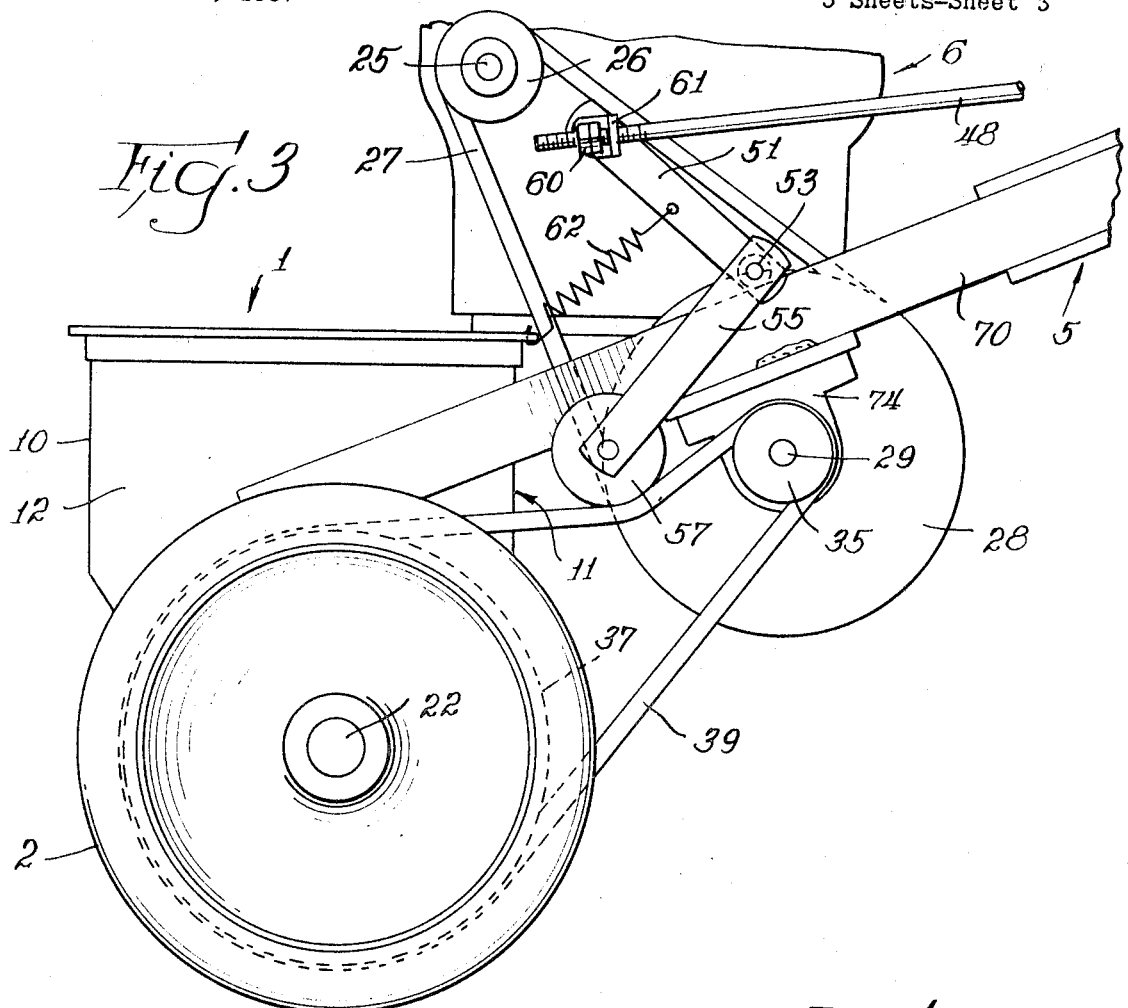
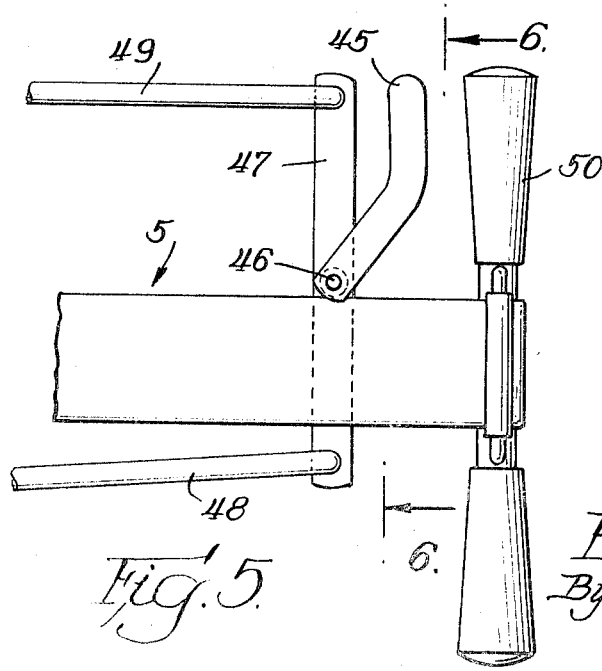
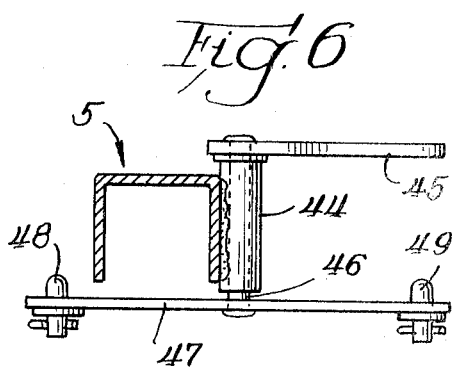
Inventor
Edward J. Siems
By Petherbridge, O'Neill & Aubel
Att'ys.

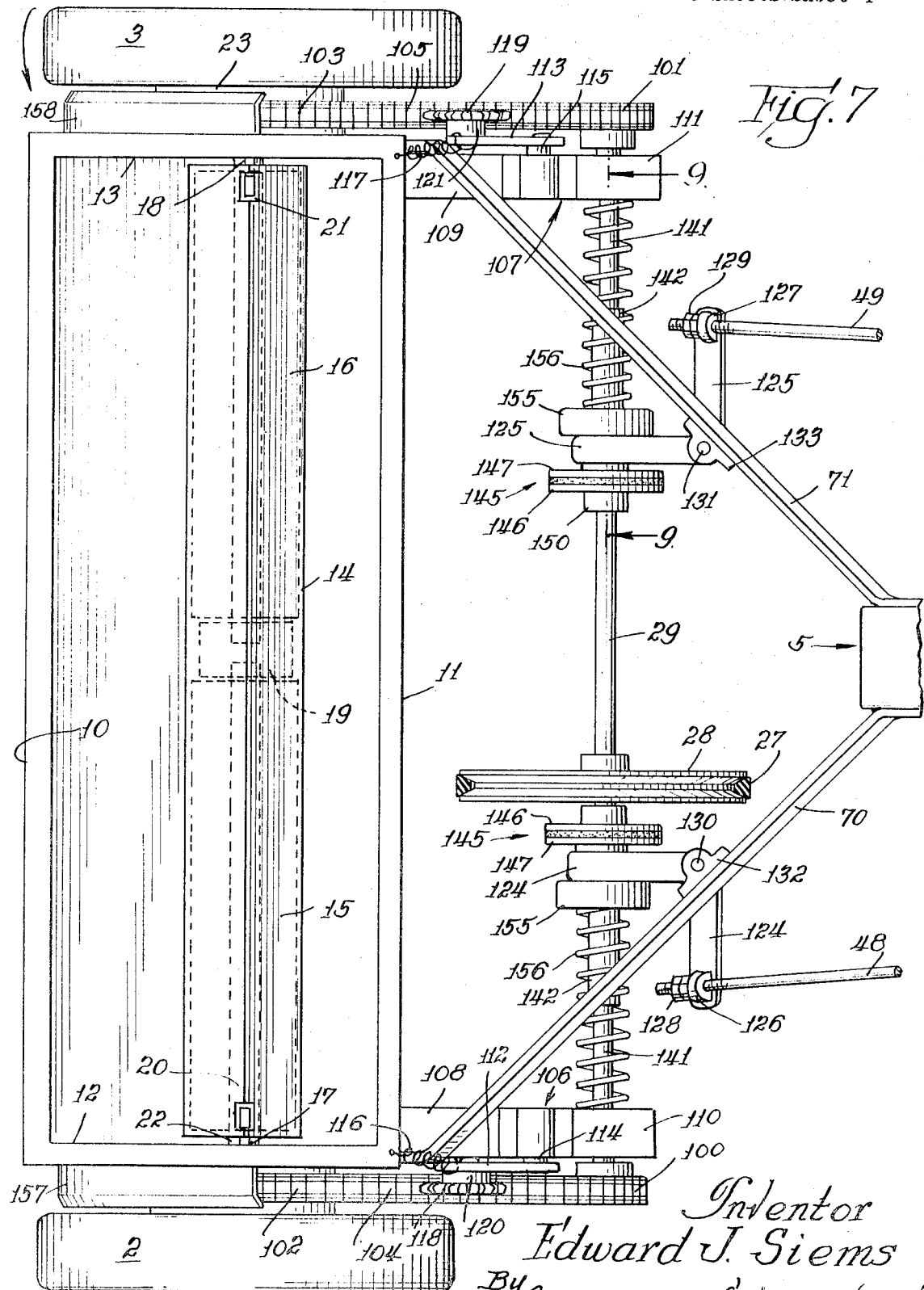

June 2, 1970  E. J. SIEMS  3,515,313
MOTORIZED SPREADER APPARATUS
Filed June 22, 1967  5 Sheets-Sheet 5
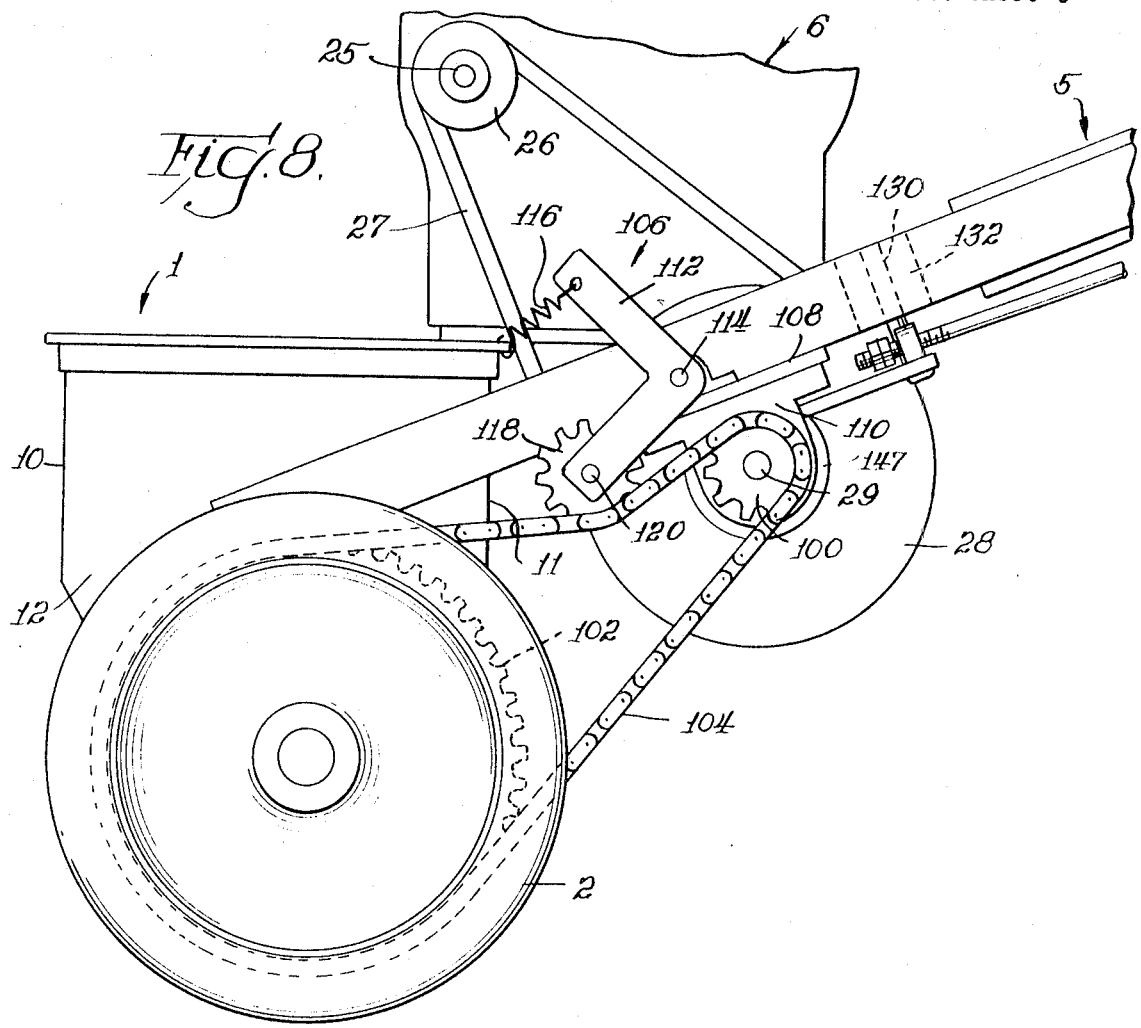
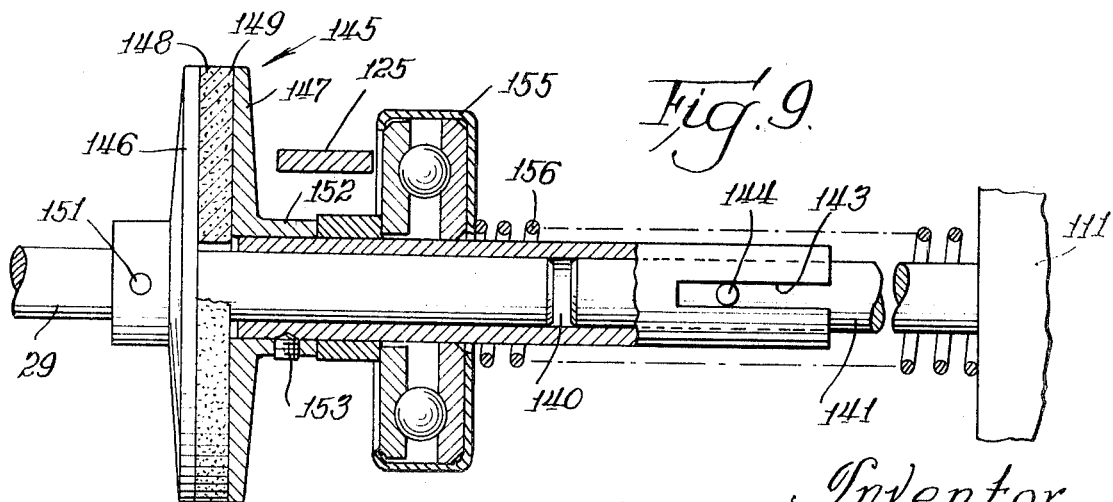
Inventor
Edward J. Siems
BY: Petherbridge, O'Neill & Auber
Att'ys.

United States Patent Office 3,515,313
Patented June 2, 1970

3,515,313
MOTORIZED SPREADER APPARATUS
Edward J. Siems, 23W215 Walnut, Roselle, Ill. 60172
Filed June 22, 1967, Ser. No. 654,302
Int. Cl. A01c 15/16; B62d 11/08, 51/04
U.S. Cl. 222—177                                2 Claims

ABSTRACT OF THE DISCLOSURE

A spreader apparatus is provided with motor-driven wheels which support a hopper for containing the material to be spread. A two-part agitator spans the breadth of the hopper along its bottom discharge opening. A motor is connected to the frame of the spreader apparatus, and the output shaft of the motor is connected through a drive train to simultaneously drive the wheels and the agitator. This drive train includes the output shaft of the motor which is connected through a primary pulley and belt system to a drive shaft. The drive shaft is connected through a secondary pulley and belt or chain and sprocket system to each of the wheels and simultaneously to the two-part agitator. Controls are provided to permit idling of the motor and spreader apparatus; to produce movement of both wheels simultaneously; or to drive one wheel independently of the other and thereby only the agitator segment to which it is connected. These controls include a clutch system which is manually operable and permits the selective rotation of the spreader wheels.

---

With the trend toward motorization and self-propulsion of implements used in gardening and lawn care and agricultural efforts, a need has developed for an efficient self-propelled apparatus for spreading a variety of materials over gardens, lawns and fields. The demand for such a spreading apparatus is one which requires that the apparatus must be produced at a relatively low cost, can be operated economically, can be readily maintained and can be stored without difficulty.

The spreader of the invention was developed to fulfill all of the requirements for a commercially valuable motorized spreader. While the spreader of the invention will find its most important use in the area of lawn care and maintenance, it may find broad application in agricultural fertilizing, seeding and garden work.

The spreader apparatus of the invention basically consists of a common laterally elongated hopper of a type which has been in use for a considerable period of time in both manual seeding and fertilizing applications. The hopper includes a broad loading opening and a restricted discharge opening at the bottom thereof. Adjacent to the bottom discharge opening, an elongated agitator member is positioned to control the flow of the material loaded into the hopper as it passes from the discharge opening. For best results, the agitator shaft is connected at opposite ends of the hopper to the wheels supporting and driving the spreader. A standard internal combustion engine motor is mounted on the hopper, although an electric motor could be readily substituted. The output shaft of the motor is provided with a centrifugal clutch of a type in common use in lawn mowers and other small motors wherein it is desired to engage the clutch only after a predetermined rotational speed of the output shaft has been achieved. This output shaft acts through a drive train to drive both wheels attached to the hopper and thereby to propel the spreader apparatus.

The drive train of the invention can involve both a belt system and a chain system. In either system, the output shaft acts through a primary belt to drive a pulley and a drive shaft. In the complete belt drive system, the rotation of the drive shaft acts through a secondary belt system to operate the hopper supporting wheels. In the belt and chain system, the rotation of the belt driven drive shaft acts through a chain and sprocket system to operate the hopper supporting wheels of the spreader. It is also possible under certain circumstances to convert the primary belt drive system to a chain and sprocket arrangement.

The apparatus is designed to produce a satisfactory motorized and self-propelled spreader. It has been found, however, that the operating speeds and power of such a unit ordinarily make it quite difficult to make even slight turns and still more difficult to turn a spreader 180° while maintaining full control of the apparatus and the discharge during such a turn. This problem has been solved by the apparatus of the invention by making the secondary belt system, driven by the drive shaft, loosely connected between the shaft and the wheels under ordinary inoperative conditions. Therefore, when the spreader apparatus of the invention is in forward motion, a lever actuated belt tensioning device is employed to sufficiently tension the loose belts connected to the wheels to drive the wheels. When it is desired to turn the spreader apparatus either to the left or to the right, a lever on the stern handle of the spreader is turned in the desired direction. This serves to actuate the tensioning device of one of the belts, releasing it and thereby permitting the belt to slip between the drive shaft and the wheel. The tensioning device adjacent the opposite belt is tightened causing the other belt to drive its respective wheel, causing the spreader to pivot about the generally stationary wheel. This drive system is highly advantageous in providing a simple, inexpensive and yet highly effective means for easily turning the spreader of the invention without difficulty and while maintaining full control at all times. In addition, it may be readily maintained and adds little weight or bulk to the spreader to interfere with storage.

In a spreader apparatus utilizing a chain and sprocket arrangement as a secondary drive system, the drive shaft is rotated and, in turn, rotates a pair of sprockets secured to it. A pair of chains connect the respective drive shaft sprockets to co-acting sprockets on the axles of adjacent wheels and through which the chain acts to drive the respective wheels. In most applications, the chain system is preferable because it provides a continuous and reliable positive drive of the spreader which is substantially unaffected by moisture or the type of terrain over which the apparatus is employed.

To enhance the positive action of the chain drive, a chain tightening device is used. The operation of the respective chains and sprocket pairs are selectively operable through a clutch arrangement of the invention which is lever operated to control the relative rotation of the sprockets and chains connected to and driven by the drive shaft.

Also, in order to produce a more uniform distribution of material being dispensed from the spreader, a two-part agitator has been employed with each of the agitator segments being connected to a respective wheel and being driven by that wheel but independent of the action of the other wheel. In this manner, as the spreader is pivoted or turned, the outer portion of the hopper and the outer agitator segment in the turn produces a higher rate of material distribution during the turn than the inner segment.

Therefore, in the spreader of the invention, simple mechanical means have been utilized in producing a relatively inexpensive and readily marketable motorized and self-propelled spreader for use in a variety of applications.

Various objects and advantages of the invention will hereinafter become more readily apparent from the following description of the drawings illustrating presently preferred embodiments thereof and wherein:

FIG. 1 is a perspective view of a spreader apparatus of the invention;

FIG. 2 is a schematic view of the drive system or train (with the motor omitted for clarity) of the apparatus of FIG. 1 for controlling the propulsion of the apparatus;

FIG. 3 is a fragmentary side elevation of the apparatus shown in FIG. 1;

FIG. 4 is a top plan view of the portion of the apparatus illustrated in side elevation in FIG. 3 with the motor omitted;

FIG. 5 is a fragmentary top plan view of the control or steering portion of the apparatus of the invention;

FIG. 6 is a sectional view taken along the lines 6—6 of FIG. 5;

FIG. 7 is a top plan view of a modified form of the apparatus illustrated in FIG. 4, with the motor omitted;

FIG. 8 is a fragmentary side elevation of the modified form of apparatus shown in FIG. 7; and FIG. 9 is a side elevation, with portions broken away of the clutch arrangement embodied in the modified form of the spreader of the invention.

Referring particularly to FIG. 1, the spreader apparatus of the invention basically consists of a hopper element, generally designated 1, hopper supporting wheels 2 and 3, a rear support wheel and carriage, generally designated 4, a steering handle 5, a gasoline engine, generally designated 6 (an electric motor or other type of engine being considered to be within the scope of the invention), and as is schematically shown in FIG. 2, a drive train, generally designated 7.

As can be best seen in FIGS. 1, 3 and 4, the hopper 1 has a laterally elongated construction formed by front and back walls 10 and 11 respectively, and left and right side walls 12 and 13, respectively. Front and back walls 10 and 11 provide an enlarged opening at the top of the hopper for loading purposes and, as shown in FIGS. 1 and 3, taper downwardly to a discharge opening 14 located at the bottom of the hopper. An agitator consisting of left and right segments 15 and 16, respectively, is positioned in the discharge opening 14 as is shown in FIG. 4. The agitator segments 15 and 16 are shown only in phantom since they may be of any of the commonly employed paddle, bladed or screw-type spreader agitators. They are shown to be supported on shafts 17 and 18, respectively, which are connected at their inner ends to a generally centrally located common bearing 19 which permits them to rotate freely relative to each other. The ends of shafts 17 and 18, opposite bearing 19 are secured at 20 and 21, respectively, to wheel axles 22 and 23. This simple construction permits the agitators to be driven directly by the wheels to which they are respectively connected.

As is illustrated in FIGS. 1 and 3, internal combustion engine 6 is mounted upon the back wall 11 of hopper 1. The engine output shaft 25, as shown in FIGS. 1 and 3 carries a pulley 26 at its outermost end. It is preferred that this pulley be a centrifugal clutch of any construction which is in common use in the motorized lawnmower or garden implement field and which acts to provide output from shaft 25 only after it has reached a predetermined rotational speed. A primary drive belt 27 is connected to output shaft 25 through pulley 26. The primary drive belt extends to an enlarged pulley 28 which is supported upon a drive shaft 29 as is shown in FIGS. 1 and 2. The engine 6 thereby serves to drive belt 27 and thereby pulley 28 and drive shaft 29 at a speed determined by the centrifugal clutch or pulley 26 as governed by engine throttle 30 and the predetermined size of pulley 28.

Referring particularly to the schematic drive train diagram of FIG. 2, it can be seen that drive shaft 29 carries a pair of pulleys 35 and 36 respectively at each end of the shaft. These pulleys are connected to a second enlarged pair of pulleys 37 and 38, which are spaced between wheels 2 and 3 and hopper side walls 12 and 13, respectively (shown in FIG. 4), by a pair of secondary drive belts 39 and 40, respectively. These latter belts are initially loosely connected to their respective pulley pairs in a manner such that they would tend to slip rather than to drive wheel pulleys 37 and 38 through the pulleys 35 and 36 of the drive shaft 29.

In order to control the locomotion of the spreader and particularly its operation during turning movements, a pair of selectively operable belt tensioning devices, generally designated 42 and 43 as shown in FIG. 2, are used. These belts tensioning devices are operated from the steering handle 5 of the spreader apparatus.

Referring particularly to FIGS. 5 and 6, it can be seen that the extreme manually controlled end of handle 5 is provided with a generally vertically extending cylinder 44 which is welded to one of the depending legs of the channel-shaped steering handle 5. A manually operable lever arm 45 is pivotally mounted on top of cylinder 44 by a pin 46 which extends through cylinder 44 and is rigidly secured to a direction control bar 47 positioned beneath it. The left and right extremities of this direction control bar are pivotally connected to left and right control rods 48 and 49, respectively. Therefore, control rods 48 and 49 can be operated through the manually operable lever 45. When lever 45 is rotated counterclockwise, pivotally mounted control rod 49 is moved away from the grip portion 50 of steering handle 5 and control rod 48 is retracted toward grip portion 50. Conversely, when the lever 5 is moved in a clockwise direction, control rod 48 is moved away while control rod 49 is retracted from grip 50.

Referring again to FIG. 2, it can be seen that control rods 48 and 49 extend from direction control bar 47 to pivot members 51 and 52, respectively, which are rigidly connected to extension shafts 53 and 54. The extension shafts are, in turn, rigidly connected to pulley support members 55 and 56. A pair of pulleys 57 and 58 are rotatably mounted at the extreme ends of pulley support members 55 and 56, respectively. These pulleys 57 and 58 act through manually controlled lever 45 to tension and release secondary drive belts 39 and 40. The tensioning of these belts serves to eliminate the looseness and slippage between the pulleys 35 and 37 and 36 and 38 whereby the wheels 2 and 3 of the spreader apparatus may be simultaneously or independently driven.

When it is desired to turn the spreader apparatus to the left, the lever 45 which is pivotally mounted on the extreme end of steering handle 5 is pushed counter-clockwise and in the direction of the turn. This acts to rotate the end of direction control bar 47 pivotally carrying control rod 48 toward grip 50 and to rotate the end of bar 47 to which control rod 49 is pivotally connected away from grip 50 at the end of steering handle 5. As control rod 48 is retracted toward grip 50, the opposite end of the rod, to which a nut 60 has been threaded, engages a flange plate 61 which is secured to pivot members 51 (best seen in FIG. 4), and rotates pivot member 51 backward toward grip 50 and against the force of compression spring 62. The backward rotation of pivot member 51 serves to raise pulley 57 through the rigid linkage 53 and 55 from drive belt 39, or at least partially therefrom, to produce total or at least partial slippage of the secondary drive belt 39 with respect to pulleys 35 and 37. In this manner, the left wheel 2 is not driven at all or at a relatively slow pace through slippage of the belt. Simultaneously with the retraction of control rod 48, control rod 49 is thrust forward and through lost motion permitted by the free movement of the extreme end of control rod 49 through a flange plate 63 secured to pivot member 52. This lost motion of rod 49 with respect to pivot member 52 and flange plate 63 enables the tension spring 64 connected to pivot member 52 to maintain pulley 58 in belt tensioning engagement with belt 40, thereby maintaining pulleys 36 and 38 in a fully driven condition through belt 45. This permits greater relative rotation of wheel 3 with respect to wheel 2 and causes the spreader apparatus to begin to turn to the left.

By reversing the direction of lever 35 on handle 5, that is by rotating the lever 45 toward grip 50 in a clock-wise movement, the position of the direction control bar 47 is reversed as are the control rods 48 and 49 and the relative wheel rotation of wheels 2 and 3 is reversed whereby wheel 2 rotates at a greater relative speed than wheel 3 to permit the spreader apparatus to turn to the right.

Simultaneously with the difference in relative rotation produced between wheels 2 and 3 through the actuation of lever 45, the agitator segments 15 and 16 are driven at correspondingly reduced or increased rates of relative rotation. This is particularly desirable in sweeping turns to provide an even distribution of the material being spread over the area covered by the turn. In the absence of relative rotation of the agitator segments, the innermost portion of the turning axis would be heavily covered with material while the outer portion of the turn would be relatively lightly covered. By providing for the relative rotation of the agitator segments as well as the wheels, this can be overcome and a uniform material distribution can be achieved.

As can be best observed in FIG. 4, the steering handle 5 is provided with a pair of yoke elements 70 and 71 which are connected at their outermost end to the steering handle 5 and at their innermost end to side walls 12 and 13 of the hopper. A pair of laterally extending support cylinders 72 and 73 are welded to yoke elements 70 and 71 respectively. These support elements serve as rigid journal supports for extension shafts 53 and 54, respectively, of the belt tensioning devices 42 and 43. A pair of rotary shaft bearings 74 and 75 are welded to support cylinder 72 and 73 to provide a support means for the extremities of the drive shaft 29.

With particular reference to FIG. 4, a pulley guard 77 is shown connected to side wall 12 of the hopper and extending between the side wall and wheel 2 and in front of wheel pulley 37 in a manner such that the pulley and belt portion are protected from entanglement with leaves, twigs, grass, weeds, etc. Side wall 13 of the hopper is similarly provided with a pulley guard 78 connected to side wall 13 and positioned between the side wall and wheel 3 in a manner similar to that of pulley guard 77.

Referring particularly to FIG. 1, rear support wheel and carriage 4 provides a structure consisting of a U-shaped frame member 80, which is connected to back wall 11 of the hopper and steering handle 5 at its junction with yoke elements 70 and 71, and a wheel 81 pivotally mounted thereon for distributing the weight of the spreader and its contents. This has been found to greatly facilitate ease of handling and controlling the spreader during operation. A reinforcing strut 82 is connected between the end of handle 5 and the base of hopper back wall 11 to add strength and rigidity to the construction.

Referring now to a preferred embodiment of the spreader apparatus of the invention illustrated in FIGS. 7, 8 and 9, it can be seen that this apparatus also basically consists of a hopper element, generally designated 1 (like reference numerals are employed herein to denote structural features generally corresponding to those of the embodiment of FIGS. 1 through 6), hopper supporting wheels 2 and 3, a rear support wheel and carriage, generally designated 4, a steering handle 5, and a gasoline engine, generally designated 6 (an electric motor or other type of engine being considered to be within the scope of the invention).

As illustrated in FIGS. 7 and 8, the hopper 1 has a laterally elongated construction formed by front and back walls 10 and 11 respectively, and left and right side walls 12 and 13, respectively. Front and back walls 10 and 11 provide an enlarged opening at the top of the hopper for loading purposes and taper downwardly to a discharge opening 14 located at the bottom of the hopper. An agitator consisting of left and right segments 15 and 16, respectively, is positioned in the discharge openings 14. They are shown to be supported on shafts 17 and 18, respectively, which are connected at their inner ends to a generally centrally located common bearing 19 which permits them to rotate freely relative to each other. The ends of shafts 17 and 18, opposite bearing 19 are secured at 20 and 21, respectively, to wheel axles 22 and 23. This simple construction permits the agitators to be driven directly by the wheels to which they are respectively connected.

An internal combustion engine 6 is mounted upon the back wall 11 of hopper 1. The engine output shaft 25, as shown in FIG. 8 carries a pulley 26 at its outermost end. In this embodiment, it is also preferred that this pulley be a centrifugal clutch of any construction which is in common use in the motorized lawnmower or garden implement field and which acts to provide output from shaft 25 only after it has reached a predetermined rotational speed. A primary drive belt 27 is connected to output shaft 25 through pulley 26. The primary drive belt extends to an enlarged pulley 28 which is supported upon a drive shaft 29. In particular applications, it would be possible to utilize sprockets and a chain instead of the described pulley and belt arrangement. The engine 6 serves to drive belt 27 and thereby pulley 28 and drive shaft 29 at a speed determined by the centrifugal clutch or pulley 26 as governed by engine throttle 30 and the predetermined size of pulley 28.

Referring particularly to FIGS. 7 and 8, it can be seen that drive shaft 29 of this embodiment carries a pair of sprockets 100 and 101 respectively at each end of the shaft. These sprockets are connected to a second enlarged pair of sprockets 102 and 103, which are spaced between wheels 2 and 3 and hopper side walls 12 and 13, respectively, (shown in FIG. 7) by a pair of secondary drive chains 104 and 105, respectively. These chains are initially loosely connected to their respective sprocket pairs 100–102 and 101–103 in a manner facilitating installation of the chains.

In order to provide positive chain tightening or tensioning of the initially loose chains, a pair of independently operable chain tensioning devices, generally designated 106 and 107 and best shown in FIG. 8, are used. These chain tensioning devices are designed for independent and automatic operation to continuously compensate for varying degrees of chain looseness.

As is shown in FIGS. 7 and 8, the chain tensioning devices 106 and 107 are respectively connected to a pair of plate members 108 and 109. The inner ends of these plate members are secured by suitable means to the hopper assembly, and the outer ends of the plate members serve as mounting bases for rotary bearings 110 and 111 which are designed to support opposite ends of the drive shaft 29. The tensioning devices themselves consist of generally L-shaped members 112 and 113 which are pivotally mounted on the ends of the plate members 108 and 109 adjacent rotary bearings 110 and 111 by pivot pins 114 and 115 located at the juncture of the leg portions providing the L-shape of the respective members. Tension springs 116 and 117 are connected between the back wall 11 of the hopper 1 and the uppermost legs of L-shaped members 112 and 113. The extremities of the other legs of the L-shaped members 112 and 113 are provided with sprockets 118 and 119 which are permitted to freely rotate about axles 120 and 121 rigidly secured to members 112 and 113, respectively.

During operation of the spreader apparatus, a chain tightening or tensioning force is continuously applied to the drive chain 104 and 105 through the resilient tensioning force applied by springs 116 and 117 against the upper extremities of L-shaped members 112 and 113. This force is transmitted automatically and independently through members 112 and 113 to sprockets 118 and 119. These sprockets engage the respective chains 103 and 104 meshing with the links thereof while exerting a positive downward tensioning force on to the chains and thereby maintaining a continuous positive chain grip by the sprocket pairs 100–102 and 101–103.

The controls on handle 5 and their operation as discussed in connection with FIGS. 5 and 6, are applicable to the embodiment of FIGS. 7 and 8 and can be employed in the operation of this embodiment.

Referring particularly to FIGS. 5, 6 and 7, it can be seen that control rods 48 and 49 extend from direction control bar 47 on the steering handle 5 to generally L-shaped pivot members 124 and 125, respectively. As is shown in FIG. 7, the extremities of control rods 48 and 49 are threaded and project through flanges 126 and 127 formed on members 124 and 125. Nuts 128 and 129 are threaded onto the control rod ends to permit the reciprocation of the rods without the displacement of the rod ends from the flanges 126 and 127. Pivot members 124 and 125 are pivotally connected through pivot pins 130 and 131 to mounting brackets 132 and 133 which are, in turn, welded to yoke elements 70 and 71.

The dual clutch arrangement of the preferred embodiment of the invention is best illustrated in FIGS. 7 and 9. While the clutch system operated by pivot member 125 will be discussed in detail in connection with FIG. 9, it is understood that the clutch system actuated by pivot member 124 contains substantially identical components.

As can best be seen in FIG. 9, drive shaft 29 is broken at 140 and includes a segment 141 which is rotatably supported in rotary bearing 111. The drive sprocket 101 is secured to the extreme end of shaft segment 141. A sleeve bearing 142 is telescoped over a portion of drive shaft 29, break 140, and over a portion of segment 141. The sleeve bearing 142 is provided with a horizontal slot 143 which coacts with a guide pin 144 secured to segment 141 to permit the horizontal controlled reciprocation of the sleeve bearing with respect to shaft segment 141.

A clutch unit, generally designated 145, is provided with a pair of plates 146 and 147 to each of which a frictional disc 148 and 149, respectively is bonded or secured in a conventional clutch construction manner. Clutch plate 146 is formed with an integral boss 150 projecting therefrom. Boss 150 is telescoped over drive shaft 29 and rigidly secured thereto by a set screw 151 so that clutch plate 146 and disc 148 rotate at the speed of the drive shaft. On the other hand, clutch plate 147 is also formed with an integral boss 152, but the boss is telescoped over sleeve bearing 142 and rigidly secured thereto by a set screw 153. Therefore, the linkage comprising plate 147 and disc 249, sleeve bearing 142, drive shaft segment 141 and sprocket 101 is designed for rotation at the same speed.

Still referring to FIG. 9, a conventional thrust bearing, generally designated 155, is disposed for horizontal sliding movement across sleeve bearing 142. A compression spring 156 is telescoped over the sleeve bearing and portions of the drive shaft 29 and segment 141. Spring 156 is compressively retained between bearing 111 and thrust bearing 155. The resilient force exerted by the spring 156 is applied to thrust bearing 155 which in turn applies a force to integral boss 152. This produces the firm engagement of clutch discs 148 and 149 resulting in the rotation of the plate 147, disc 149, bearing 142, segment 141 and sprocket 101 linkage at substantially the same speed as drive shaft 29.

When it is desired to turn the spreader apparatus to the right, the lever 45, shown in FIGS. 5 and 6, which is pivotally mounted on the extreme end of steering handle 5 is pushed clockwise and in the direction of the turn. This acts to rotate the end of direction control bar 47 pivotally carrying control rod 49 toward grip 50 and to rotate the end of bar 47 to which control rod 48 (FIG. 7) is pivotally connected away from grip 50 at the end of steering handle 5. As control rod 49 is retracted toward grip 50, the opposite end of the rod, to which nut 129 has been threaded, engages flange 127, which is formed on pivot member 125, and rotates pivot member 125 in a clockwise direction. The outermost leg of the L-shaped pivot member 125 is rotated into engagement with thrust bearing 155 and, overcoming the bias of spring 156, moves the thrust bearing out of engagement with boss 152 of clutch plate 147. This permits the partial or complete separation of discs 148 and 149 of the clutch 145 resulting in the reduction in speed of clutch plate 147, sleeve bearing 142, segment 141, sprocket 101 and chain 105 through clutch slippage or the complete stoppage of rotation through the disengagement of the clutch elements. Upon release of lever 45 on steering handle 5, the spring 156 overcomes the force of pivot member 124 and reestablishes the engagement of discs 148 and 149 resulting in the power of drive shafts 29 again being fully transmitted to segment 141. Simultaneously with the retraction of control rod 49, control rod 48 is thrust forward through lost motion permitted by the free movement of the extreme end of control rod 48 through flange 126 on pivot member 124. This lost motion of rod 48 with respect to pivot member 124 and flange plate 126 enables the rod 48 to slide through flange 126 without disturbing clutch 145 thereby maintaining sprockets 100 and 102 and chain 104 in a fully driven condition through belt 45. This permits greater relative rotation of wheel 2 with respect to wheel 3 and causes the spreader apparatus to begin to turn to the right.

By reversing the direction of lever 45 on handle 5, that is by rotating the lever 45 away from grip 50 in a counterclockwise movement, the position of the direction control bar 47 is reversed as are the control rods 48 and 49 and the relative wheel rotation of wheels 2 and 3 is reversed whereby wheel 3 rotates at a greater relative speed than wheel 2 to permit the spreader apparatus to turn to the right.

As was the case in the earlier embodiment, simultaneously with the difference in relative rotation produced between wheels 2 and 3 through the actuation of lever 45, the agitator segments 15 and 16 are driven at correspondingly reduced or increased rates of relative rotation. This is particularly desirable in sweeping turns to provide an even distribution of the material being spread over the area covered by the turn. In the absence of relative rotation of the agitator segments, the innermost portion of the turning axis would be heavily covered with material while the outer portion of the turn would be relatively lightly covered. By providing for the relative rotation of the agitator segments as well as the wheels, this can be overcome and a uniform material distribution can be achieved.

The steering handle 5 of the embodiment of FIGS. 7 through 9 is also provided with a pair of yoke elements 70 and 71 which are connected at their outermost end to the steering handle 5 and at their innermost end to side walls 12 and 13 of the hopper.

With particular reference to FIG. 7, a pulley guard 157 is shown connected to side wall 12 of the hopper and extending between the side wall and wheel 2 and in front of wheel sprocket 102 in a manner such that the sprocket and chain portion are protected from entanglement with leaves, twigs, grass, weeds, etc. Side wall 13 of the hopper is similarly provided with a sprocket guard 158 connected to side wall 13 and positioned between the side wall and wheel 3 in a manner similar to that of guard 157.

In a manner similar to FIG. 1, a rear support wheel and carriage 4 provide a structure consisting of a U-shaped frame member 80, which is connected to back wall 11 of the hopper and steering handle 5 at its junction with yoke elements 70 and 71, and a wheel 81 pivotally mounted thereon for distributing the weight of the spreader and its contents. This has been found to greatly facilitate ease of handling and controlling the spreader during operation. A reinforcing strut 82 is connected between the end of handle 5 and the base of hopper back wall 11 to add strength and rigidity to the construction.

As is shown in the drawings and discussed above, the embodiments of the spreader apparatus of the invention provide simple motorized spreader propulsion systems which are controlled through simple mechanical linkages to permit safely controlled forward motion of the spreader apparatus and fully controlled turns of the apparatus whether they be short turns or full 180° or 360° turns. The agitator of this spreader is simultaneously controlled to produce a uniform material deposit in relation to the relative rotation of the wheel to which it is connected.

Various modes of carrying out the invention are contemplated as being within the scope of the following claims particularly pointing out and distinctly claiming the subject matter which is regarded as the invention.

I claim:

1. A spreader apparatus comprising a laterally elongated hopper for receipt and discharge of a material to be spread by the apparatus, said hopper having a material discharge opening disposed along its lower end, a first agitator segment disposed in said hopper adjacent said material discharge opening and extending from one lateral end thereof to a point positioned proximate the mid-way point of said hopper, a second agitator segment disposed in said hopper adjacent said material discharge opening and extending from the opposed lateral end of said hopper to a point positioned proximate the mid-way point of said hopper, each of said first and second agitator segments having a shaft disposed therethrough to provide independent rotational movement of each of said agitator segments, said hopper having a wheel mounted thereon adjacent each of the laterally opposed ends of said hopper, motor means mounted on said hopper, said motor means including an output shaft, a first driving element mounted on said output shaft, a drive shaft provided with a second driving element, first interconnecting means connecting said first and second driving elements for driving said drive shaft in response to the rotational movement of said output shaft, said drive shaft further including third and fourth driving elements mounted thereon adjacent laterally opposing ends thereof, wheel drive means mounted on each of said wheels, second and third interconnecting means connecting said third and fourth driving elements with said wheel drive means respectively for driving said wheels in response to the rotational movement of said output shaft, said second and third-interconnecting means being normally connected loosely between said third and fourth driving elements and said wheel drive means respectively to produce slippage of said interconnecting means and prevent movement of said wheels, means for conditioning said interconnecting means provided adjacent said second and third interconnecting means respectively to permit selective conditioning of said second and third interconnecting means to produce selective movement of each of said wheels independently of one another, said conditioning means including lever actuable fifth and sixth driving means disposed adjacent said second and third interconnecting means respectively and actuable to selectively engage said second and third interconnecting means respectively to produce movement of the corresponding wheel, and to disengage and loosen said second and third interconnecting means to prevent movement in each of the corresponding wheels, steering means connected to said hopper for controlling movement thereof, and said lever for actuating said fifth and sixth driving means being disposed upon said steering means and being manually operable.

2. A spreader apparatus comprising a laterally elongated hopper for receipt and discharge of a material to be spread by the apparatus, said hopper having a material discharge opening disposed along its lower end, a first agitator segment disposed in said hopper adjacent said material discharge opening and extending from one lateral end thereof to a point positioned proximate the mid-way point of said hopper, a second agitator segment disposed in said hopper adjacent said material discharge opening and extending from the opposed lateral end of said hopper to a point positioned proximate the mid-way point of said hopper, each of said first and second agitator segments having a shaft disposed therethrough to provide independent rotational movement of each of said agitator segments, said hopper having a wheel mounted thereon adjacent each of the laterally opposed ends of said hopper, motor means mounted on said hopper, said motor means including an output shaft, a first pulley mounted on said output shaft, a drive shaft provided with a second pulley, a first belt connecting said first and second pulleys for driving said drive shaft in response to the rotational movement of said output shaft, said drive shaft further including third and fourth pulleys mounted thereon adjacent laterally opposing ends thereof, wheel pulleys mounted on each of said wheels, second and third belts interconnecting said third and fourth pulleys with said wheel pulleys respectively for driving said wheels in response to the rotational movement of said output shaft, said second and third belts being normally connected loosely between said third and fourth pulleys and said wheel pulleys respectively to produce slippage of said belts and prevent movement of said wheels, belt tensioning means provided adjacent said second and third belts respectively to permit selective tensioning of said second and third belts to produce selective movement of each of said wheels independently of one another said belt tensioning means including lever actuable fifth and sixth pulleys disposed adjacent to said second and third belts respectively and actuable to selectively engage and tension said second and third belts respectively to produce movement of the corresponding wheel, and to disengage and loosen said second and third belts to prevent movement in each of the corresponding wheels, steering means connected to said hopper for controlling movement thereof, and said lever for actuating said fifth and sixth pulleys being disposed upon said steering means and being manually operable.

References Cited

UNITED STATES PATENTS

| | | | |
|---|---|---|---|
| 1,734,718 | 11/1929 | Donald | 180—6.2 |
| 2,713,917 | 7/1955 | Soenksen | 192—49 X |
| 2,792,970 | 5/1957 | Gaiman | 222—177 X |
| 2,801,030 | 7/1957 | Beck | 222—177 |
| 3,040,504 | 6/1962 | Wickin | 180—19 X |
| 3,087,180 | 4/1963 | Webster | 180—19 X |
| 3,164,301 | 1/1965 | Hargreaves et al. | 222—177 X |
| 3,087,180 | 4/1963 | Webster | 180—19 X |

ROBERT B. REEVES, Primary Examiner

F. R. HANDREN, Assistant Examiner

U.S. Cl. X.R.

222—178; 180—6.2, 19

UNITED STATES PATENT OFFICE
CERTIFICATE OF CORRECTION

Patent No. 3,515,313 June 2, 1970

Edward J. Siems

It is certified that error appears in the above identified patent and that said Letters Patent are hereby corrected as shown below:

Column 7, line 52, "249" should read -- 149 --.

Signed and sealed this 23rd day of February 1971.

(SEAL)
Attest:

Edward M. Fletcher, Jr.
Attesting Officer

WILLIAM E. SCHUYLER, JR.
Commissioner of Patents